Patented Sept. 18, 1923.

1,468,341

UNITED STATES PATENT OFFICE.

ROBERT E. CARTER, OF CHAMPAIGN, ILLINOIS.

BATTERY REJUVENATOR.

No Drawing.   Application filed October 10, 1921.   Serial No. 506,930.

*To all whom it may concern:*

Be it known that I, ROBERT E. CARTER, a citizen of the United States, residing at Champaign, in the county of Champaign and State of Illinois, have invented certain new and useful Improvements in Battery Rejuvenators, of which the following is a specification.

This invention relates to electro-chemistry, and more especially to wet storage batteries such as are employed in automobiles and tractors; and the object of the same is to produce a chemical which may be used to excite new batteries or to rejuvenate old ones.

A further object is to produce a chemical which renders the battery better in many ways as will be explained, and which is inexpensive and easily handled.

After the present day battery has been in use for a number of months, and especially if it has not had the best of care, its usefulness will suddenly terminate. There may be a deposit or precipitate at the bottom of the jars, the plates may have buckled or burnt out, or from other causes the battery has reached a condition where it cannot be recharged; and the owner either purchases a new one or has the old one rebuilt.

Moreover, from the dealer's standpoint, there exists a demand for a chemical which can be employed to rejuvenate old or second-hand batteries quickly so as to render them more readily salable.

My chemical satisfies these demands. The new battery treated with it will have a greater capacity than one not so treated; the old battery treated with it will give better service than a new one untreated. The compound can be used on all types of storage batteries to their advantage; it is non-explosive; it permits charging of the battery in twenty-four hours, whereas forty-eight are usually required; it renders the battery free from injury by overcharging or undercharging while in legitimate use; and if a battery treated with my compound should freeze, it is not injured but need only be recharged.

My compound placed in the cells of an old storage battery with enough distilled water added to the original battery solution to cover the plates, and the whole placed on electric charge for twenty-four hours will produce a chemical change or action that forces the disintegrated and precipitated battery materials up from the bottom of the jars along with the new material in my compound, and deposits them on the battery plates. This combination (the material deposited on the plates) then becomes an active agent, capable of continued performance of its function in the chemical changes which take place while the battery is giving off its electricity. When my compound is used in an old storage battery, it will clean the wooden separators and prevent them from becoming gummed or cracked, so that further depreciation is checked. A new or old battery treated with this compound will produce a quicker spark and render more dependable and continuous service than without it.

My compound is a paste made up of a powder and a liquid. The formula for the powder is as follows:

|  | Grams. |
|---|---|
| Gypsum, $CaSO_4 2H_2O$ | 15 |
| Lead oxide, $PbO$ | 47 |
| Magnesium oxide, $MgO$ | 16 |
| French zinc,* $ZnO$ | 30 |
| Epsom salts, $MgSO_4 7H_2O$ | 14 |
| Graphite, $C$ | 16 |
| Salt, $NaCl$ | 3 |
|  | 141 |

*The French zinc above mentioned is a form of zinc oxid.

In some cases where old batteries do not respond quickly when placed on charge with my compound in them, a small quantity of blue vitriol (say 3 grams) should be added to the above.

The formula for the liquid is as follows:

| Acetic acid, $HC_2H_3O_2$ | 35 cc. |
|---|---|
| Paraffin or empyreumatic oil | 5 cc. |
| Distilled water | 40 cc. |
|  | 80 cc |

I do not wish to be limited strictly to the above proportions, but have found that satisfactory results are produced with these.

The component parts of the powder are mixed together, and also those of the liquid; and then the powder is thoroughly mixed with the liquid as by stirring, until the whole becomes a viscid or pasty compound. steel gray in color. During the agitation bubbles of gas rise through the mass and escape; after the mixing is complete the paste gradually hardens and turns a darker gray; and after forty-eight hours this is ground into a fine powder, ready for commercial use.

To use my compound, place about 13.2 grams, more or less, of the last-named powder in each cell of an old storage battery, and add to the original battery solution sufficient distilled water to cover the plates one-half inch; place the battery on electric charge for twenty-four hours, and it should stand the tests of a new battery. In some cases the battery so treated will discharge with insufficient capacity, and if so enough sulphuric acid ($H_2SO_4$) must be added to the solution of powder and water to bring its specific gravity up to 1.300. Should the specific gravity of the battery solution test more than 1.300 enough distilled water should be added to the solution to bring its gravity down to approximately 1.300.

What is claimed as new is:

1. A storage battery rejuvenator including French zinc acetic acid, and water.

2. A storage battery rejuvenator including French zinc, Epsom salts, an acid, and water.

3. A storage battery rejuvenator including metallic oxide, French zinc, Epsom salts, acetic acid, and water.

4. A storage battery rejuvenator including metallic oxide, French zinc, Epsom salts, and a binder; and an acid and water.

5. A storage battery rejuvenator comprising a powder including an oxide, French zinc, Epsom salts, and a binder; and a liquid including acetic acid, and water.

6. The herein described compound for rejuvenating storage batteries, the same including lead and magnesium oxides, French zinc, Epsom salts, and an exciting liquid.

7. The herein described compound for rejuvenating batteries, comprising a powder including lead and magnesium oxides, French zinc, Epsom salts, and a binder; and a liquid including acetic acid and water.

8. The herein described battery rejuvenator comprising a powder including metallic oxide about 7 parts, and gypsum, Epsom salts, and graphite about 1 part each; and a liquid including an acid and water.

In testimony whereof I affix my signature.

ROBERT E. CARTER.